United States Patent [19]

Suzuki et al.

[11] Patent Number: 4,744,763

[45] Date of Patent: May 17, 1988

[54] CONNECTOR DEVICE FOR A TRANSMISSION LINE CONNECTING TWO RELATIVELY ROTATING MEMBERS

[75] Inventors: Hironori Suzuki, Tokyo; Jiro Kakimoto, Yokohama; Masahiro Shibata, Hiratsuka, all of Japan

[73] Assignee: Furukawa Electric Co., Ltd., Japan

[21] Appl. No.: 35,499

[22] Filed: Apr. 7, 1987

[30] Foreign Application Priority Data

Apr. 15, 1986 [JP] Japan ............................. 61-55466[U]
Apr. 16, 1986 [JP] Japan ............................. 61-56102[U]

[51] Int. Cl.⁴ .......................................... H01R 39/00
[52] U.S. Cl. ...................................... 439/15; 439/164
[58] Field of Search ............... 439/15, 27, 162, 163, 439/164; 242/84.8; 191/12.2 R; 280/731

[56] References Cited

U.S. PATENT DOCUMENTS

| | | |
|---|---|---|
| 3,657,491 | 4/1972 | Ryder et al. ............... 191/12.2 |
| 3,763,455 | 10/1973 | Confer et al. .................. 439/15 |
| 4,422,699 | 12/1983 | Sakurai et al. ................ 439/164 |

Primary Examiner—Neil Abrams
Attorney, Agent, or Firm—Frishauf, Holtz, Goodman & Woodward

[57] ABSTRACT

A connector device which connects a rotatable member and a fixed member, for example, of a vehicular steering system, electrically or optically, by means of a belt-shaped transmission line coiled in a convolution. The transmission line is contained in a housing assembly which is composed of a movable housing, mounted on the rotatable-member side, and a stationary housing on the fixed-member side. A vibration restraining member is interposed between one side edge of the coiled transmission line and a flange portion of the movable and/or stationary housing. The restraining member serves to restrain the transmission line from moving crosswise, thereby preventing production of vibration and noise. Preferably, a resilient tongue, which extends along the transmission line, is fixed to an inner cylinder portion to which an inner coil-end portion of the transmission line is fixed. In such an arrangement, the transmission line is prevented from bending sigmoidally when it is loosened.

15 Claims, 7 Drawing Sheets

FIG. 18
FIG. 19
FIG. 20
FIG. 26
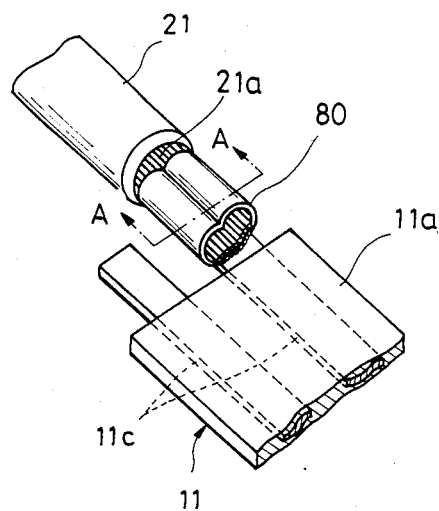
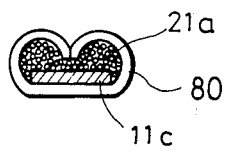
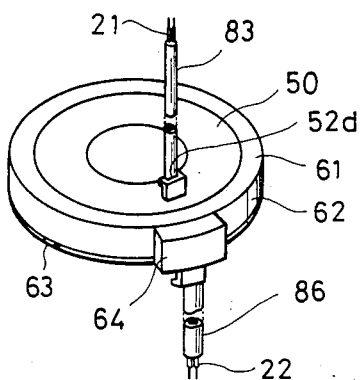
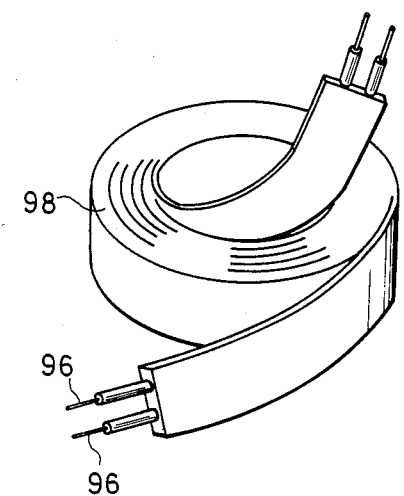

CONNECTOR DEVICE FOR A TRANSMISSION LINE CONNECTING TWO RELATIVELY ROTATING MEMBERS

BACKGROUND OF THE INVENTION

The present invention relates to a connector device for a transmission line connecting two relatively rotating members, and more particularly to a connector device for a transmission line for transferring electrical signals, optical signals, or electric power between a fixed member and a rotatable member, such as a vehicular steering system, which can make only a limited number of revolutions.

In transferring electrical signals between a rotatable member, including a steering wheel and a steering shaft of a vehicular steering system, and a fixed member, including a steering column, for example, a connector device must be provided for a transmission line which connects the rotatable and fixed members. The steering wheel can make only several turns in either direction. An electrical connector device in a vehicular steering system is disclosed in U.S. Pat. No. 4,422,699. This prior art device is an example of the connector device for the transmission line for transferring electrical signals between a fixed member and a rotatable member whose number of revolutions is finite.

The disclosed connector device comprises a movable housing attached to the rotatable member, a stationary housing attached to the fixed member, and a transmission line, such as a belt-shaped flat cable, housed in a chamber defined by the movable and stationary housing. The transmission line is wound 30 like a convolution around a steering shaft, for a plurality of turns. As the line is tightened or loosened in the chamber, the movable housing can rotate relatively to the stationary housing.

The steering connector device of this type may, for example, be applied to a transmission line which is used to transmit a starting signal to an air bag system. The air bag system, which is housed in the central portion of a steering wheel, is adapted to inflate in case of a vehicle collision, thereby preventing a driver from running against his facing structures in the vehicle. The transmission line in the chamber has one end connected to lead wires which extend from a starter of the air bag system, and the other end connected to lead wires which extend from a collision sensor mounted on the front end portion of the vehicle frame.

The connector device of this type, unlike a connector device of a slip-ring type, does not include a sliding portion which is composed of a slip ring and a brush. Therefore, it has the advantage over the slip-ring-type device that it is free from a short circuit which may be caused by metal dust produced by the sliding contact between the slip ring and the brush, and from wrong operation of the air bag system due to noise signals produced at the sliding-contact portion. Since the air bag system is the most important safety equipment, however, the connector device must be reliable and stable enough to stand prolonged use. At the same time, it is expected to be low in manufacturing cost.

Meanwhile, in the connector device of this type, the coiled transmission line is held loosely in a housing assembly, in order to permit tightening and loosening of the line. Thus, if the device is used in a structure or equipment subject to vibration, such as an automobile, the transmission line will vibrate, thereby producing noise. Such production of noise may be prevented by filling the housing assembly with grease. In such an arrangement, however, the viscosity of the grease prevents the transmission line from moving smoothly. As a result, the stress on the transmission line, as well as the necessary torque for steering wheel, increases, thus inducing snapping of the line frequently and lowering the reliability of the connector device.

If the movable housing is rotated in a direction such that the transmission line is loosened, the inner end portion of the transmission line in the housing assembly may sometimes bend sigmoidally as the movable housing approaches its rotation limit. Once it occurs, such a situation tends to appear repeatedly. In such a case, the bent portion of the transmission line is liable to snap from fatigue.

In attaching the connector device to a steering system, for example, the connector device must be adjusted so that the transmission line is located in an intermediate position between its ultimately tightened and loosened positions. In this state, the steering system is kept in its neutral position for a straight advance of the vehicle. According to the conventional connector device, however, the winding state of the transmission line cannot be detected accurately. Therefore, the connector device may possibly be attached to the steering system in a manner such that the transmission line is deviated from the intermediate position. In such a case, if the steering wheel is turned beyond the rotation limit of the movable housing, the transmission line is subjected to an excessive tension. As a result, the conventional connector device is liable to suffer snapping of the transmission line or disconnection at the junction between the transmission line and lead wires extending from the starter or the collision sensor.

If socket-type couplers are used to connect the transmission line and the lead wires extending from the starter or the collision sensor, the material and manufacturing costs of the connector device will increase. In this coupler-connection arrangement, moreover, there are three junctions; between conductors of the transmission line and female contacts of a coupler for the line, between conductors of the lead wires and male contacts of a coupler for the wires, and between the female and male contacts. If the junctions are increased in number, the quality control becomes more difficult, and the reliability of the junctions is lowered in proportion.

OBJECTS AND SUMMARY OF THE INVENTION

A primary object of the present invention is to provide a connector device for a transmission line connecting two relatively rotating members, which is reliable and stable enough to stand prolonged use, and can be manufactured at low cost.

Another object of the invention is to provide a connector device less liable to suffer snapping of a transmission line or disconnection at the junction between the transmission line and lead wires connected thereto.

Still another object of the invention is to provide a connector device in which the winding state of the transmission line in a housing assembly can be detected easily when mounting the device, so that the transmission line is prevented from snapping while it is being tightened.

A further object of the invention is to provide a connector device having a housing assembly which can be formed easily by injection molding or the like, thus enjoying relatively low manufacturing cost.

According to the present invention, there is provided a connector device having a belt-shaped transmission line coiled in the shape of a convolution, and housing means containing the transmission line, the housing means including a stationary housing attached to a fixed member and a movable housing attached to a movable member, the stationary housing being fixedly fitted with one end of the transmission line and having a first flange portion facing one side edge of the coiled transmission line, and the movable housing being fixedly fitted with the other end of the transmission line and having a second flange portion facing the other side edge of the coiled transmission line, so that the movable housing can make a plurality of revolutions relative to the stationary housing. In the connector device of the invention, vibration restraining means is disposed in at least one of spaces which are defined between the one side edge of the transmission line and the first flange portion, and between the other side edge of the transmission line and the second flange portion, whereby the transmission line is pressed in the transverse direction thereof so as to be restrained from vibrating. Since the transmission line is prevented from vibrating in the housing means, by the vibration restraining means, no noise can be produced due to vibration of the transmission line.

Preferably, the vibration restraining means is a ring-shaped plate, having a resilient member formed on that surface thereof which faces at least one of the first and second flange portions, the resilient member being formed by bending the inner and/or outer peripheral edge of the ring-shaped plate.

Preferably, moreover, the stationary or movable housing includes an inner cylinder portion fixedly fitted with the one or the other end of the transmission line, as an inner coil end, and a resilient tongue extending along the belt-shaped transmission line, the proximal end of the tongue being fixed to the inner cylinder portion. In this arrangement, even when the transmission line is loosened to its extremity as the movable housing rotates, the resilient tongue prevents the line from bending sigmoidally. Thus, the transmission line is prevented from snapping from fatigue.

Further, the movable housing is preferably formed of the second flange and an independent outer cylinder portion fitted loosely on the outer peripheral edge of the first flange of the stationary housing, the second flange portion and the outer cylinder portion being engagedly fixed to each other by engaging means. With this arrangement, the movable housing can be manufactured more easily. The same effect can be obtained if the stationary housing is formed of th first flange portion and an independent outer cylinder portion fitted loosely on the outer peripheral edge of the second flange portion of the movable housing.

Preferably, furthermore, the second flange portion is formed, on the outer surface thereof, with a spiral groove whose number of turns is equivalent to the allowable number of revolutions of the movable housing, and a sliding member is fitted on the spiral groove. The sliding member is restrained from moving in the circumferential direction, and is allowed to move only in the radial direction, by a guide member. One end of the guide member is fixed to the stationary housing, while the other end thereof extends across the spiral groove. As the movable housing rotates, the sliding member slides relatively on the groove, so that the number of revolutions of the movable housing is indicated by the position of the moved sliding member.

An electric wire cable or an optical transmission line threaded with optical fibers may suitably be used as the transmission line.

The above and other objects, features, and advantages of the present invention will be more apparent from the ensuing detailed description taken in connection with the accompanying drawings.

BRIEF DESCRIPTION OF THE DRAWINGS

FIG. 18 is a partial perspective view showing in detail the junction between a transmission line and lead wires of the connector device of FIG. 16;

FIG. 19 is a partial sectional view taken along line A—A' of FIG. 18;

FIG. 20 is a perspective view of the connector device of FIG. 16 in an assembled state;

FIG. 26 is an exploded perspective view of an optical transmission line threaded with optical fibers.

DETAILED DESCRIPTION

FIGS. 1 to 7 show conventional connector devices applied to a vehicular steering system. The devices each comprise a belt-shaped transmission line or flat cable 11, coiled in the shape of a convolution, and a housing assembly 12 containing the cable 11. The housing assembly 12 includes a movable housing 13 on the inner-cylinder side and a stationary housing 14 on the outer-cylinder side.

Figure 1:
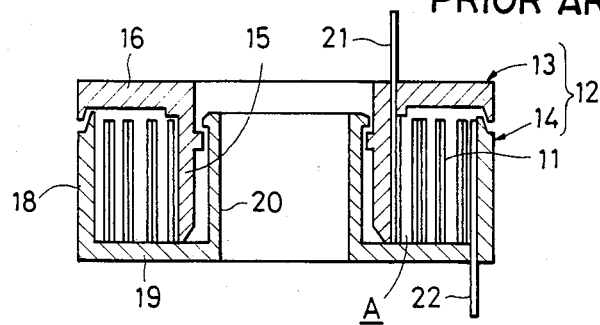
FIG. 1 is a longitudinal sectional view of a prior art connector device.
Figure 2:
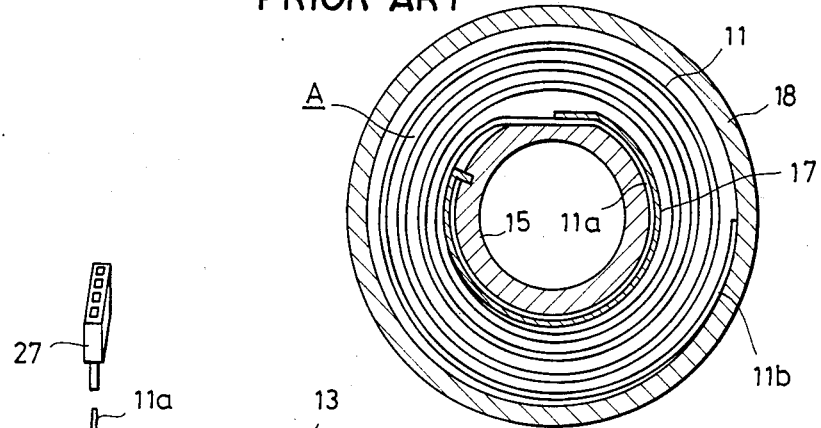
FIG. 2 is a cross-sectional view of the connector device shown in FIG. 1.

The inner-cylinder-side housing 13 is formed integrally of an inner cylinder 15 and a flange 16. An inner coil-end portion 11a of the coiled flat cable 11 is fixed to the inner cylinder 15 by means of a fixing ring 17, as shown in FIG. 2. The flange 16 faces and covers the upper side edge of the cable 11.

The outer-cylinder-side housing 14 is composed of an inner-cylinder shaft 20, a flange 19, and an outer cylinder 18. The inner cylinder 15 of the inner-cylinder-side housing 13 is rotatably fitted on the outer peripheral wall of the shaft 20. The flange 19 extends integrally outward from the lower end of the shaft 20, in the radial direction thereof, and faces and covers the lower side edge of the coiled flat cable 11. The outer cylinder 18 is formed on the outer peripheral edge of the flange 19, so as to extend parallel to and coaxial with the shaft 20. An outer coil-end portion 11b of the calbe 11 is fixed to the outer cylinder 18.

The inner housing 13 is fixed to the side of a steering wheel (not shown) and a steering shaft (not shown), while the outer housing 14 is fixed to the side of a steering column (not shown). The two housings can rotate relatively, within a range such that the coiled flat cable 11 can be tightened or loosened.

Lead wires 21 are connected to the inner coil-end portion 11a of the flat cable 11. The wire 21 are drawn out of the inner housing 13 through an aperture which is bored through the flange 16 of the housing 13. Likewise, lead wires 22 are connected to the outer coil-end portion 11b of the cable 11. The wires 22 are drawn out of the outer housing 14 through an aperture which is bored through the flange 19 of the housing 14.

Figure 3:
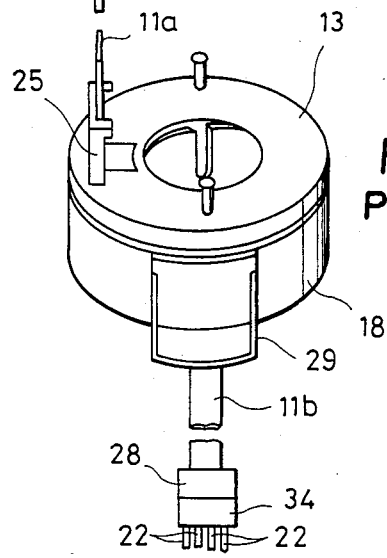
FIG. 3 is a perspective view of another prior art connector device, illustrating the way the coil-end portions of a transmission line are connected to lead wires by means of couplers.
Figure 4:
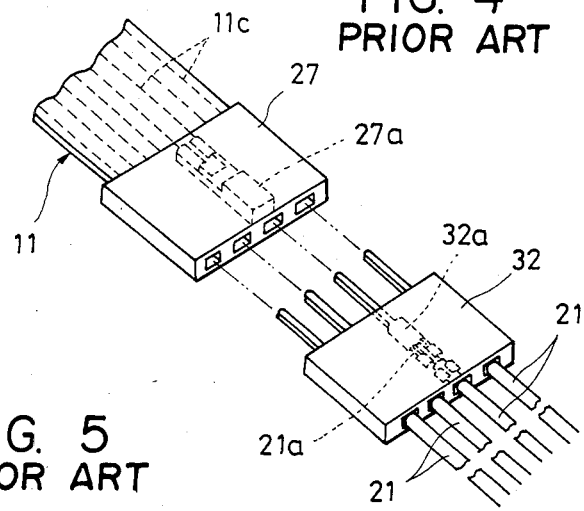
FIG. 4 is a partial, enlarged perspective view illustrating the way one of the coil-end portions of the transmission line of FIG. 3 is connected to the lead wires.

In an alternative conventional arrangement, the inner and outer coil-end portions of a belt-shaped or flat cable are bent substantially at right angles, and the bent ends are drawn out directly. In FIGS. 3 and 4, showing such an arrangement, the inner coil-end portion 11a of the flat cable 11, drawn out of the inner-cylinder-side housing 13, is fixed thereto with use of fixing means 25. Likewise, the outer coil-end portion 11b, drawn out of the outer-cylinder-side housing 14, is fixed thereto by using fixing means 29. Cable-side couplers 27 and 28 are connected to the end portions 11a and 11b, respectively. Conventionally, as shown in FIG. 4, individual conductors 11c of the flat cable 11, on its inner-end side, are connected to their corresponding female contacts 27a of the coupler 27, by pressure-coupling. A wire-side coupler 32 is connected to the female coupler 27. Conductors 21a of each of the lead wires 21 are connected to one of male contacts 32a of the coupler 32 by pressure-coupling. In FIG. 4, only the contacts 27a and 32a of the couplers 27 and 32 are shown, and the other contacts are omitted. Likewise, the cable-side female coupler 28 is connected to a wire-side coupler 34, to which the lead wires 22 are connected.

The lead wires 21 are connected, for example, to an air bag system (not shown), a combination switch (not shown), etc., which are attached to the side of the steering wheel and the steering shaft. The lead wires 22 are connected to apparatuses on the steering-column side or on the vehicle-body side.

In the prior art connector device constructed in this manner, the flat cable 11 always electrically connects the apparatuses on the movable-member side, i.e., on the side of the steering wheel and the steering shaft, and the apparatuses on the fixed-member side, i.e., on the side of the steering column, without using any sliding-contact portion, such as a combination of a slip ring and a brush. Within the rotatable range of the steering wheel, such an electrical connection is ensured without regard to the rotation of the wheel. Thus, the connector device of this type constitutes a transmission line which is more reliable than the one provided by the connector device of the slip-ring type.

Figure 5:
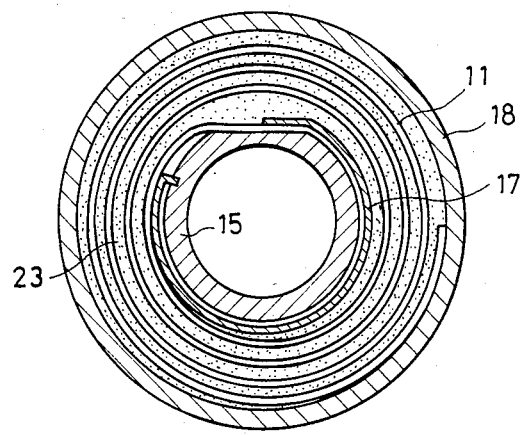
FIG. 5 is a cross-sectional view showing a modification of the prior art connector device of FIGS. 1 and 2, in which a housing assembly is filled with grease, thereby preventing vibration of the transmission line.
Figure 6:
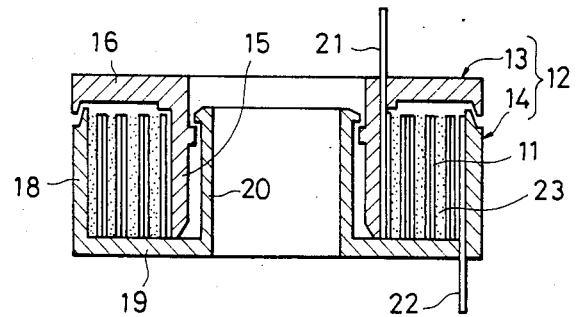
FIG. 6 is a longitudinal sectional view of the connector device shown in FIG. 5.

In order to permit tightening and loosening, however, the flat cable 11 is contained loosely in a chamber A which is defined by the inner- and outer-cylinder-side housings 13 and 14. While a vehicle is running, therefore, the cable 11 vibrates and produces noise. To prevent such production of noise, an arrangement has been tried such that the space A is filled with grease 23, as shown in FIGS. 5 and 6. This arrangement has a substantial effect on the prevention of the production of noise. However, the grease 23 is so viscous that the flat cable 11 cannot move smoothly. Therefore, the necessary torque for the rotation of the steering wheel is increased, and also, the tensile stress acting on the cable 11 becomes greater. Thus, the cable 11 is liable to snap.

Figure 7:
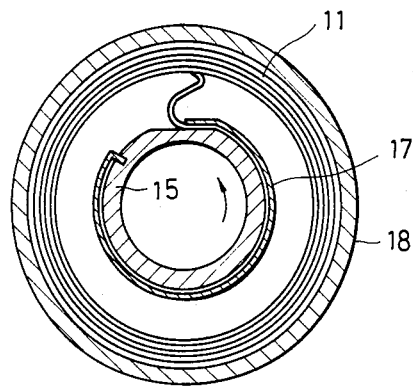
FIG. 7 is a cross-sectional view of the prior art connector device for illustrating an awkward situation of the transmission line loosened substantially to its extremity.

If the inner-cylinder-side housing 13 is rotated near to the extremity in the loosening direction of the flat cable 11, that part of the cable 11 near its inner coil-end portion is liable to bend sigmoidally, as shown in FIG. 7. If such bending is repeated, the cable 11 can be easily broken, at the bent portion, by fatigue.

In the prior art arrangement of electrical connection shown in FIG. 4, moreover, there are three junctions; between the conductors 11c of the flat cable 11 and the female contacts 27a of the cable-side coupler 27, between the conductors 21a of the lead wires 21 and the male contacts 32a of the wire-side coupler 32, and between the female and male contacts 27a and 32a. If the junctions are increased in number, disconnection or noise is caused more frequently, and the reliability is lowered in proportion. Also, the more the junctions, the larger is the number of components used, and the higher are the material and manufacturing costs.

Referring now to FIGS. 8 to 26, connector devices according to the present invention will be described in detail.

Figure 9:
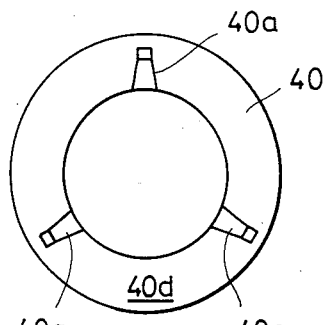
FIG. 9 is a top view showing in detail a vibration restraining plate 40 shown in FIG. 8.
Figure 8:
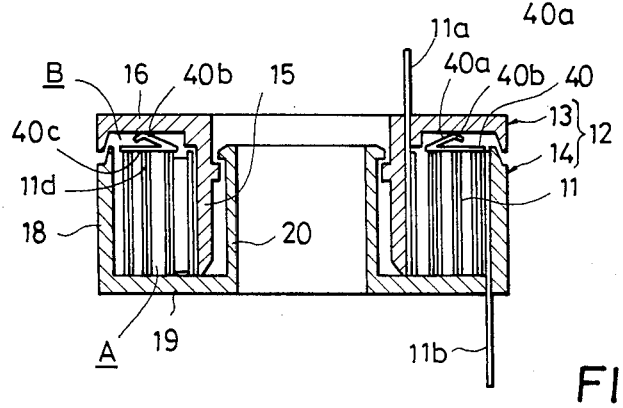
FIG. 8 is a longitudinal sectional view of a connector device according to an embodiment of the present invention.
Figure 10:
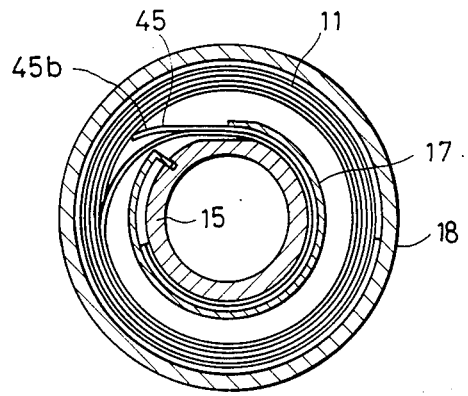
FIG. 10 is a cross-sectional view of the connector device shown in FIG. 8.

FIGS. 8 to 10 show an embodiment of the present invention. In these drawings, like reference numerals refer to like components having substantially the same constructions and functions as in the prior art connector device shown in FIGS. 1 to 4. Detailed description of these components is omitted herein.

In the connector device according to this embodiment, a vibration restraining plate 40 is disposed in a space B, which is defined between a flange 16 of an inner-cylinder-side housing 13 and an upper side edge 11d of a flat cable 11 coiled in a convolution. As shown in FIGS. 8 and 9, the vibration restraining plate 40 is a ring-shaped resilient metal plate which is made of phosphor bronze. The outside diameter of the plate 40 is shorter than the inside diameter of an outer cylinder 18 of an outer-cylinder-side housing 14. The inside diameter of the plate 40 is longer than the outside diameter of an inner cylinder 15 of the inner-cylinder-side housing 13. Three bent spring pieces 40a are formed, by bending, at regular intervals on an upper surface 40d of the plate 40, so as to protrude radially outward from the inner peripheral edge thereof. As shown in FIG. 8, the spring pieces 40a have their respective top portions 40b abutting against the inner wall surface of the flange 16, to be bent thereby. Thus, a lower surface 40c of the vibration restraining plate 40 is pressed softly against the upper side edge 11d of the flat cable 11, by means of the repulsive force of the top portions 40b. As a result, the cable 11, which is contained loosely in the space A inside a housing assembly 12, is restrained from vibrating, and therefore, from producing noise.

The vibration restraining plate 40 must only be pressed softly against the upper side edge 11d of the flat cable 11. Therefore, the force of the plate 40 to suppress the tightening or loosening action of the cable 11 is so weak that it cannot increase the torque for the rotation of the inner-cylinder-side housing 13 considerably.

In the embodiment described above, the vibration restraining plate 40 is provided with the three spring pieces 40a. However, the number and mechanical strength of the spring pieces may be determined as required, depending on the necessary pressure to be applied to the flat cable 11. In the above embodiment, moreover, the spring pieces 40a are formed on the inner peripheral edge of the restraining plate 40. Alternatively or besides, the spring pieces may be formed on the outer peripheral edge of the plate 40.

Figure 12:
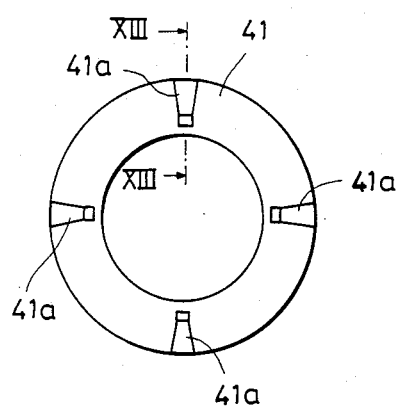
FIG. 12 is a top view showing in detail a modification of the vibration restraining plate.
Figure 13:
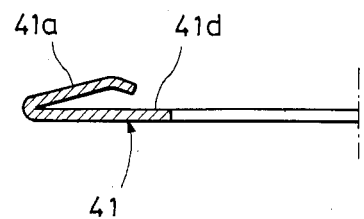
FIG. 13 is a partial sectional view taken along line XIII—XIII of FIG. 12.

FIGS. 12 and 13 show a modification of the vibration restraining plate. A restraining plate 41 of this modification includes four spring pieces 41a, which are formed, by bending, at regular intervals on an upper surface 41d of the plate 41, so as to protrude radially inward from the outer peripheral edge thereof.

Figure 14:
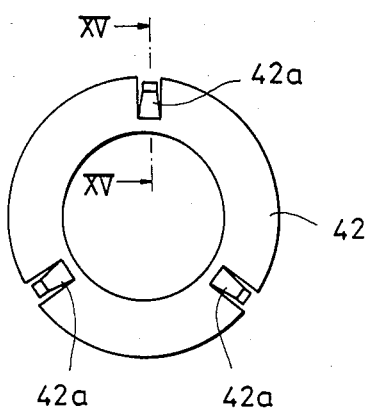
FIG. 14 is a top view showing in detail another modification of the vibration restraining plate.
Figure 15:
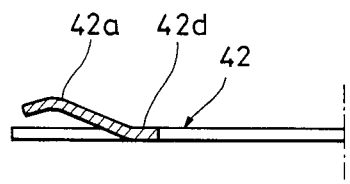
FIG. 15 is a partial sectional view taken along line XV—XV of FIG. 14.
Figure 17:
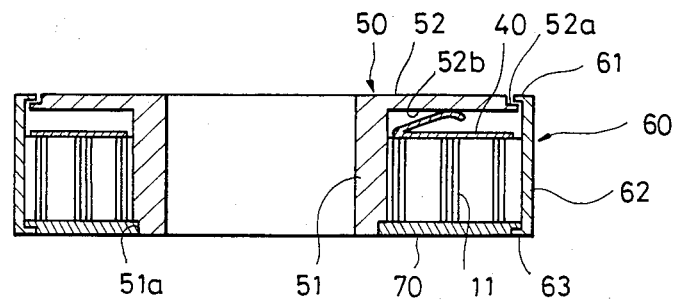
FIG. 17 is a longitudinal sectional view of the connector device shown in FIG. 16.
Figure 16:
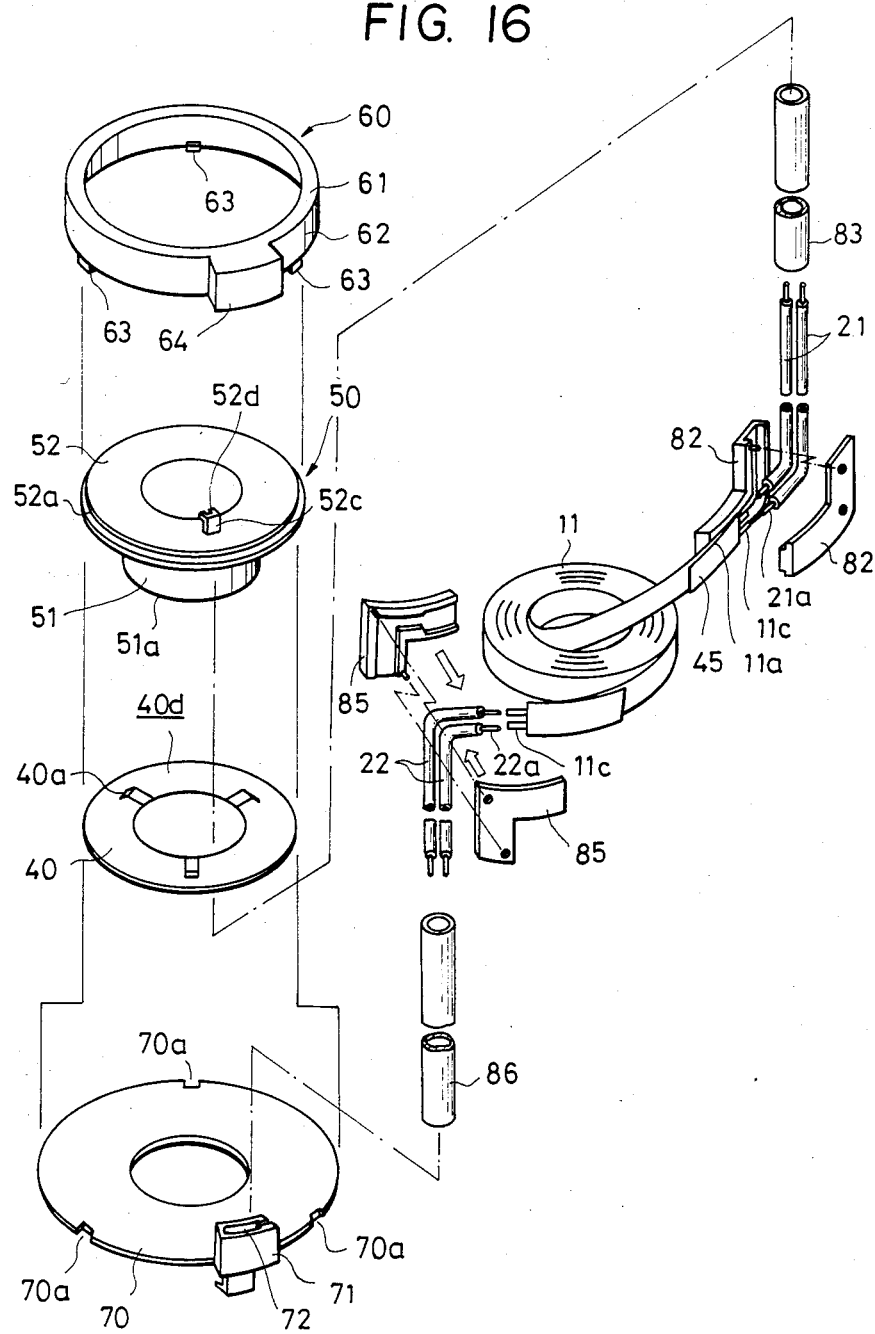
FIG. 16 is an exploded perspective view of a connector device according to another embodiment of the invention.
Figure 21:
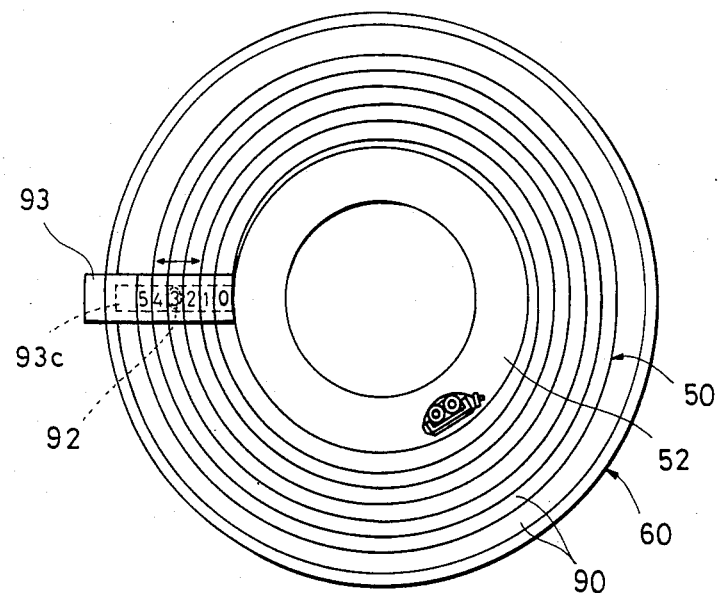
FIG. 21 is a top view of a connector device according to still another embodiment of the invention.
Figure 22:
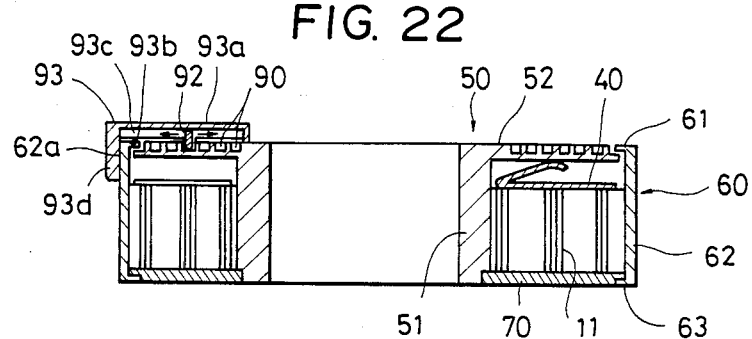
FIG. 22 is a longitudinal sectional view of the connector device shown in FIG. 21.
Figures 23, 24, 25:
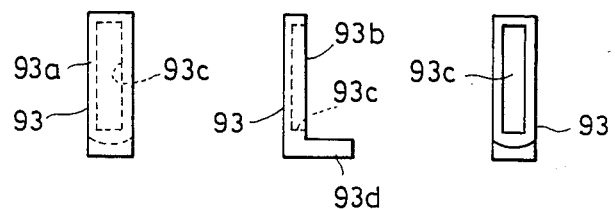
FIG. 23 is a top view of a guide member or a scaler 93 shown in FIG. 21 and 22.
FIG. 24 is a side view of the scaler 93.
FIG. 25 is a bottom view of the scaler 93.

FIGS. 14 and 15 show another modification of the vibration restraining plate. Spring pieces 42a of a restraining plate 42 of this modification are formed by cutting and raising part of a ring-shaped plate. Each spring piece 42a is raised from a position on an upper surface 42d of the plate 42, at an outward radial distance substantially equal to a quarter of the width of the ring, from the inner peripheral edge thereof.

In any of the aforementioned vibration restraining plates, the spring pieces are formed integrally with the plate, by bending or raising. Alternatively, however, separate spring pieces may be fixed to the restraining plate.

In the arrangement of FIGS. 8 and 9, moreover, the vibration restraining plate 40 is interposed between the flange 16 of the inner-cylinder-side housing 13 and the upper side edge 11d of the flat cable 11. Alternatively or besides, the restraining plate may be interposed between a flange 19 of the outer-cylinder-side housing 14 and the lower side edge of the cable 11.

Figure 11:
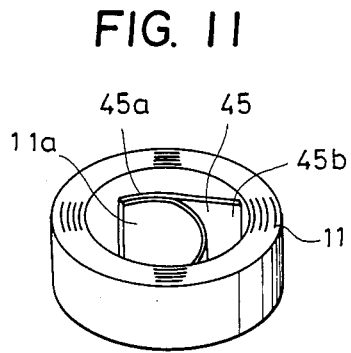
FIG. 11 is a perspective view of a transmission line 11 for illustrating the way a resilient tongue 45 shown in FIG. 10 is held in position.

Another feature of the present invention lies in that a resilient tongue 45 is located along the outer surface of the coiled flat cable 11, which extends from the inner cylinder 15, as shown in FIG. 10. The resilient tongue 45 is formed, for example, of a polyester sheet of a suitable thickness. A proximal end 45a of the tongue 45 is bonded to the outer surface of the inner coil-end portion 11a of the flat cable 11, i.e., that surface thereof opposite to the inner cylinder 15, as shown in FIG. 11. Then, the proximal end 45a, along with the cable 11, is fixed to the cylinder 15 by means of a fixing ring 17, as shown in FIG. 10. A distal end 45b of the resilient tongue 45 leaves the fixing ring 17 at a position where the tongue 45 terminates after covering the substantially entire periphery of the inner cylinder 15. The distal end 45b is pressed against the inner surface of the coiled flat cable 11, by its own resilience.

When the flat cable 11 is loosened substantially to the limit, by a rocking motion of the inner-cylinder-side housing 13, for example, the outer surface of that portion of the cable 11 near the inner cylinder 15 is in contact with the resilient tongue 45. Thus, the cable 11 is prevented from being deformed further, that is, from bending sigmoidally.

In the arrangement shown in FIG. 10, the resilient tongue 45 extends from the inner cylinder 15, along the outer surface of the flat cable 11, and the proximal end 45a of the tongue 45 is bonded to the cable 11. Alternatively, however, the resilient tongue 45 may be made to extend along the inner surface of the cable 11, and be bonded to the cable 11 substantially over the full length of the tongue 45. In this case, the inner coil-end portion of the cable 11 is so rigid that it can hardly bend sigmoidally.

FIGS. 16 to 20 show a connector device according to another embodiment of the present invention. In this device, a housing assembly, used in place of the housing assembly 12 of FIG. 10, comprises three principal parts. More specifically, the housing assembly according to the second embodiment comprises a first housing 50, a second housing 60, and a baseplate 70. In FIGS. 16 to 20, like reference numerals refer to like components having substantially the same constructions and functions as those shown in FIGS. 8 to 10. Detailed description of these portions is omitted herein.

The first housing 50 includes an inner cylinder 51 and a ring-shaped flange 52. The flange 52 is formed integrally on the upper end of the outer peripheral wall of the cylinder 51, so as to extend radially outward therefrom. A lead-wire retaining portion 52c, having a slit groove 52d, is formed at a predetermined position on the inner peripheral edge of the flange 52. Lead wires 21 are fitted in the slit groove 52d. Also, a step portion 52a is formed on the outer peripheral edge of the flange 52. A flange 61 (mentioned later) of the second housing 60 is loosely fitted on the step portion 52a for rotation. A step portion 51a is formed on the lower end edge of the inner cylinder 51. The inner peripheral edge of the baseplate 70 is loosely fitted on the step portion 51a for rotation.

The baseplate 70, which is ring-shaped, has an outside diameter substantially equal to that of the flange 52 of the first housing 50. A lead-wire retaining block 71 is formed integrally on a predetermined portion of the outer peripheral edge of the baseplate 70. The retaining block 71 has a slit groove 72 which opens on one side thereof, with respect to the circumferential direction of the baseplate 70. Lead wires 22 are fitted in the slit groove 72. Three retaining recesses 70a are formed, at regular circumferential intervals, on the outer peripheral edge of the baseplate 70.

The second housing 60 includes an outer cylinder 62 and a flange 61. The outer cylinder 62 has an inside diameter a little greater than the outside diameter of the flange 52 of the first housing 50. The flange 61 is formed integrally on the top end portion of the inner peripheral wall of the outer cylinder 62, so as to protrude radially inward therefrom. As mentioned before, the inner peripheral edge of the flange 61 is rotatably fitted on the step portion 52a of the flange 52 of the first housing 50. Three retaining clicks 63 are formed, at regular circumferential intervals, on the lower end edge of the outer cylinder 62. With the clicks 63 individually engaging the retaining recesses 70a of the baseplate 70, the second housing 60 and the baseplate 70 rotate in a body, along the step portion 51a of the inner cylinder 51 of the first housing 50 and the outer periphery of the flange 52, respectively. A cover portion 64 protrudes integrally from the outer wall of the outer cylinder 62, corresponding in position to the lead-wire retaining block 71 of the baseplate 70. Thus, the cover portion 64 is adapted to enclose the retaining block 71.

Two flat conductors 11c are exposed from an inner coil-end portion 11a of a flat cable 11. Conductors 21a, exposed at one end side of the lead wires 21, are connected directly to the conductors 11a by soldering or pressure-coupling, without using couplers or the like. The lead wires 21 are bent substantially at right angles, in the region near the junction with the cable 11. The other end portions of the wires 21 extend upward. In FIGS. 18 and 19, one of the conductors 11c of the flat cable 11 is connected to one of the conductors 21a of the lead wires 21 by pressure-coupling such that a pressure-coupling fitting 80, in the form of a plate, is crimped around the joint between them. Thus, by connecting the conductors 11c of the cable 11 and the conductors 21a of the lead wires 21 without the use of couplers, the number of components used in the connector device, and hence the manufacturing cost, can be reduced. Moreover, the lead wires 21 and the flat cable 11 are connected at only one junction, so that the possibility of wire snapping at the junction or production of noise is very little, thus ensuring improved reliability of the connector device.

The junction between the flat cable 11 and the lead wires 21 is covered by a pair of supporters 82, which are formed of an insulating material, such as polyacetal. Each supporter 82 is L-shaped so as to fit the shape of the structure in the vicinity of the junction between the cable 11 and the lead wires 21. Those portions of the wires 21 which are not covered by the supporters 82 are shielded with a flexible protective tube 83.

The two flat conductors 11c are exposed also from an outer coil-end portion 11b of the cable 11. Conductors 22a, exposed at one end side of the lead wires 22, are connected directly to the conductors 11c by pressure-coupling, without using couplers or the like. The lead wires 22 are bent substantially at right angles, in the region near the junction with the cable 11. The other end portions of the wires 22 extend downward. The junction between the cable 11 and the lead wires 22 is covered by a pair of supporters 85, which are similar to the supporters 82. Those portions of the lead wires 22 which are not covered by the supporters 85 are shielded with a flexible protective tube 86.

The lead wires 21, covered by the protective tube 83, are passed through a ring-shaped vibration restraining plate 40, and are fitted into the slit groove 52d of the lead-wire retaining portion 52c of the first housing 50, so as to project upward from the housing 50. The lead wires 22, covered by the protective tube 86, are fitted into the slit groove 72 of the lead-wire retaining block 71 of the baseplate 70, so as to project downward from the baseplate 70. With the lead wires 21 and 22 projecting in this manner, the coiled flat cable 11 is placed on the upper surface of the baseplate 70, and the restraining plate 40 is put on the upper end edge of the cable 11. Thereafter, the inner cylinder 51 of the first housing 50 is inserted into a cylindrical center space of the coiled cable 11. Then, the step portion 51a of the cylinder 51 is fitted into the inner peripheral edge of the baseplate 70 so that the lower surface of the flange 52 abuts against spring pieces 40a of the vibration restraining plate 40. In this state, the second housing 60 is fitted onto the first housing 50 and the base plate 70, from above the first housing 50. In doing this, the cover portion 64 is put on the lead-wire retaining block 71, and the retaining clicks 63 are caused to engage the retaining recesses 70a of the baseplate 70. Thus, the assembling of the connector device is completed. If the first housing 50 is used as a movable housing and is fixed to a rotatable member on the side of the steering wheel and the steering shaft, for example, and if the combination of the second housing 60 and the base plate 70 is used as a stationary housing and is fixed to a fixed member on the steering-column side, the first housing 50 can be made rotatable relatively to the second housing 60 and the baseplate 70.

Alternatively, the first housing 50 may be used as the stationary housing which is fixed to the fixed member on the steering-column side, for example. In this case, the combination of the second housing 60 and the baseplate 70 is used as the movable housing which is fixed to the side of the steering wheel and the steering shaft. In such an arrangement, the second housing 60 and the baseplate 70 are rotatable relatively to the first housing 50.

Since the lead wires 21 and 22, in assembling, can be fitted in the slit grooves 52d and 72, respectively, the assembly work is easy. Moreover, the housing assembly is composed of three elements, the first and second housings 50 and 60 and the baseplate 70. In comparison with the case of the housing assembly 12 of the connector device shown in FIG. 8, therefore, the components of the housing assembly according to this embodiment are simple in configuration. Thus, the housing assembly can be formed more easily when it is molded by using an injection-molding machine. In consequence, the manufacturing cost can be reduced.

FIGS. 21 to 25 show a connector device according to still another embodiment of the present invention. In this embodiment, indicator means is provided on the upper surface of the flange 52 of the first housing 50 of the connector device shown in FIGS. 16 to 20. The indicator means serves to indicate the number of revolutions of the first housing 50, for use as the movable housing, relative to the second housing 60 as the stationary housing.

More specifically, a spiral groove 90 is formed on the upper surface of the flange 52 of the first housing 50, winding around the center of rotation of the housing 50. A revolution indicator piece 92 is fitted in the groove 90. It can slide along the groove 90, thus rotating relatively to the first housing 50.

On the other hand, a proximal portion 93d of an L-shaped scaler or guide member 93, used to indicate the number of revolutions of the first housing 50, is fixed to the upper portion of an outer wall 62a of the second housing 60, as the stationary housing. A bent-end arm 93a of the scaler 93 lies over the upper surface of the flange 52 of the first housing 50, extending across and at right angles to the spiral groove 90. The scaler 93 is formed of a transparent plastic material in order that the indicator piece 92 can be seen through it. A guide groove 93c is formed on a lower surface 93b of the arm 93a which faces the groove 90. The groove 93c extends at right angles to the groove 90. The indicator piece 92, which is fitted in the spiral groove 90, is fitted also in the guide groove 93c. Thus, the groove 93c restricts the movement of the indicator piece 92 so that the piece 92 is prevented from moving in the circumferential direction of the first housing 50, with respect to the scaler 93, and can move only in the radial direction of the housing 50. Divisions 0, 1, 2, 3, 4 and 5 are engraved on the upper surface of the arm 93a of the scaler 93. These divisions are used to indicate the allowable number of revolutions of the first housing 50.

As the first housing 50 rotates, the revolution indicator piece 92 is caused to move radially over a distance corresponding to the number of revolutions of the housing 50, by a joint action of the spiral groove 90 of the housing 50 and the guide groove 93c of the scaler 93. The number of revolutions of the first housing 50, relative to the second housing 60, can be indicated by the position of the moved piece 92. Thus, in the connector device fitted with the revolution indicator means, the winding state of the flat cable in the housing assembly can be detected easily. When mounting this connector device on a steering system, for example, the first housing 50 is rotated to the middle position of its rotatable range such that the indicator piece 92 is adjusted to the point halfway between the divisions 2 and 3. In this state, the first housing 50 is mounted on the side of the steering wheel and the steering shaft, which are fixed to their respective positions for a straight advance of the vehicle. On the other hand, the second housing 60 and the baseplate 70 are mounted on the steering-column side. Thus, the flat cable 11 in the housing assembly can be mounted accurately in a normal winding state, so that it is less likely to snap due to wrong mounting of the connector device.

The guide groove 93c of the scaler 93 may be formed with a slit which opens on the surface of the arm 93a. The slit has a width such that the revolution indicator piece 92 cannot slip off therefrom. In this case, the scaler 90 need not be formed of a transparent plastic material through which the piece 92 can been seen.

If the transmission line is used to transmit electrical signals or electric power, then it is an electric wire cable, such as the flat cable 11, as in the embodiments described above. When using the transmission line for transmitting optical signals, however, an optical transmission line threaded with optical fibers 96, as shown in FIG. 26, can be used suitably for that purpose.

According to the embodiments described herein, the connector device of the present invention is applied to a vehicular steering system which is furnished with an air bag system, combination switch, etc. The connector device of this type may, however, be applied to any other suitable arrangements which are expected to transfer electrical or optical signals or electric power between two relatively rotating members which can make only a limited number of revolutions.

What is claimed is:

1. A connector device, comprising:
   a belt-shaped transmission line coiled in the shape of a convolution, said coiled transmission line having side edges;
   housing means containing said coiled transmission line, said housing means including a stationary housing portion attached to a fixed member and a movable housing portion attached to a movable member, said stationary housing portion being fixedly coupled to one end portion of said transmission line and having a first flange portion facing one side edge of said coiled transmission line, and said movable housing portion being fixedly coupled to another end portion of said transmission line and having a second flange portion facing the other side edge of said coiled transmission line, so that said movable housing portion can make a plurality of revolutions relative to said stationary housing portion;
   a space being defined between at least one of said side edges of said coiled transmission line and its respective facing flange portion; and
   vibration restraining means disposed in at least one of said spaces and including at least one resilient member for applying a resilient restraining force between at least one of said first and second flange portions and its associated side edge of said coiled transmission line.

2. The connector device of claim 1, wherein said vibration restraining means comprises a ring-shaped plate member, having said at least one resilient member projecting from a surface thereof which faces said at least one of said first and second flange portions.

3. The connector device of claim 2, wherein said ring-shaped member has inner and outer peripheral edges, and said at least one resilient member is formed by bending at least a portion of at least one of said inner and outer peripheral edges of said ring-shaped plate member.

4. The connector device of claim 2, wherein said ring-shaped plate member has inner and outer peripheral edges, and said at least one resilient member is formed by bending at an intermediate portion of said ring-shaped plate member between said inner and outer peripheral edges thereof.

5. The connector device of claim 4, wherein said at least one resilient member comprises a resilient member formed by cutting and raising part of said intermediate portion of said ring-shaped plate member.

6. The connector device of claim 1, wherein said restraining means comprises said at least one resilient member projecting from a surface thereof which faces said at least one of said first and second flange portions.

7. The connector device of claim 1, wherein said restraining means has inner and outer peripheral edges, and said at least one resilient member is formed by bending at least a portion of at least one of said inner and outer peripheral edges.

8. The connector device of claim 1, wherein said stationary housing portion includes:
   an inner cylinder portion fixedly coupled to said one end portion of said transmission line, as an inner coil end; and
   a resilient tongue extending along said belt-shaped transmission line, a proximal end of said resilient tongue being fixedly coupled to said inner cylinder portion.

9. The connector device of claim 1, wherein said movable housing portion includes:
   an inner cylinder portion fixedly coupled to said another end portion of said transmission line, as an inner coil end; and
   a resilient tongue extending along the belt-shaped transmission line, a proximal end of said resilient tongue being fixedly coupled to said inner cylinder portion.

10. The connector device of claim 1, wherein said movable housing portion includes:
an independent outer cylinder portion fitted loosely on an outer peripheral edge of said first flange portion of said stationary housing portion; and
engaging means for engagedly connecting said second flange portion to said outer cylinder portion of said movable housing portion.

11. The connector device of claim 1, wherein said stationary housing portion includes:
an independent outer cylinder portion fitted loosely on an outer peripheral edge of said second flange portion of said movable housing portion; and
engaging means for engagedly connecting said first flange portion to said outer cylinder portion of said stationary housing portion.

12. The connector device of claim 1, wherein said second flange portion has on the outer surface thereof, a spiral groove whose number of turns is equivalent to the allowable number of revolutions of said movable housing portion, and which further comprises:
a sliding member fitted on said spiral groove; and
a guide member having one end fixed to said stationary housing portion and another end extending across said spiral groove;
said sliding member being arranged to slide relatively on said spiral groove as said movable housing portion rotates, so that a number of revolutions of said movable housing portion is indicated by the position of said sliding member; and
said guide member including means for restraining said sliding member from moving in the circumferential direction of said second flange portion, and for allowing said sliding member to move only in the radial direction of said second flange portion.

13. The connection device of claim 1, wherein said transmission line is an electric wire cable.

14. The connector device of claim 13, wherein said electric wire cable includes a plurality of conductors, and further comprising a pressure-coupling fitting for coupling said conductors of said electric wire cable directly to conductors of respective lead wires by pressure-coupling.

15. The connector device of claim 1, wherein said transmission line is an optical transmission line including optical fibers.

* * * * *